United States Patent
Murray et al.

[11] Patent Number: 5,891,966
[45] Date of Patent: Apr. 6, 1999

[54] WATERBORNE SILICON HYDRIDE CROSSLINKABLE LATEX COMPOSITIONS AND METHODS OF PREPARING THE SAME

[75] Inventors: David Logan Murray, Fall Branch; Martha Jean Collins, Blountville, both of Tenn.; James Wayne Taylor, Gurnee, Ill.

[73] Assignee: Eastman Chemical Company, Kingsport, Tenn.

[21] Appl. No.: 988,567

[22] Filed: Dec. 11, 1997

[51] Int. Cl.$^6$ .................................................. C08F 8/00
[52] U.S. Cl. ........................... 525/342; 525/100; 525/105
[58] Field of Search ............................. 525/342, 105, 525/100

[56] References Cited

U.S. PATENT DOCUMENTS

| | | |
|---|---|---|
| 4,334,036 | 6/1982 | Yonezawa et al. . |
| 4,962,165 | 10/1990 | Bortnick et al. . |
| 5,321,082 | 6/1994 | Ohsugi et al. . |
| 5,539,073 | 7/1996 | Taylor et al. . |
| 5,585,407 | 12/1996 | Patel et al. . |

FOREIGN PATENT DOCUMENTS

| | | |
|---|---|---|
| 109495 | 5/1984 | European Pat. Off. . |
| 0 226 307 | 6/1987 | European Pat. Off. . |
| 0 450 844 | 10/1991 | European Pat. Off. . |
| 0 566 095 | 10/1993 | European Pat. Off. . |
| 0 602 933 | 6/1994 | European Pat. Off. . |
| 0 630 943 | 12/1994 | European Pat. Off. . |
| 0 658 575 | 6/1995 | European Pat. Off. . |
| 0 702 068 | 3/1996 | European Pat. Off. . |

OTHER PUBLICATIONS

Patent Abstracts of Japan, vol. 096, No. 005, 31 May 1996 & JP 08 003409 A (Asahi Chem. Ind. Co., Ltd.), 9 Jan. 1996, see abstract.

*Homogenous Catalysis of Hydrosilation by Transition Metals*, John L. Speier, Advances in Organometallic Chemistry, vol. 17, pp. 407–447, Academic Press, 1979.

*Reaction Kinetics and Injection Molding of Liquid Silicone Rubber*, Gibson L. Batch and Christopher W. Macosko, Rubber Chemical Technology, 64(2), 218–33, 1991.

*Primary Examiner*—Edward J. Cain
*Attorney, Agent, or Firm*—Rose M. Allen; Harry J. Gwinnell

[57] ABSTRACT

The present invention provides waterborne crosslinkable polymer compositions encompassing (A) functional latex polymers containing at least one pendant ethylenically unsaturated functional group, (B) a silicon hydride compound containing at least two reactive hydrogen atoms, and (C) a catalyst suitable to attain a crosslinked film.

17 Claims, No Drawings

5,891,966

WATERBORNE SILICON HYDRIDE CROSSLINKABLE LATEX COMPOSITIONS AND METHODS OF PREPARING THE SAME

BACKGROUND OF THE INVENTION

The present invention relates to crosslinkable waterborne polymer compositions suitable for coatings. In particular, the present invention relates to waterborne compositions encompassing a functional latex polymer containing an ethylenically unsaturated moiety, a silicon hydride material and a catalyst suitable for reaction of the silicon hydride with the functional latex polymer.

The increased awareness of the effects of volatile organic solvents on the environment is causing a re-evaluation of the use of solvents in coatings. As a result, many coatings manufacturers are switching from organic to water based coatings systems. The typical strategy used to produce waterborne coatings which form hard, tough films, has been to produce an emulsion polymer with a glass transition temperature (Tg) above room temperature and plasticize this polymer with a solvent to lower the Tg of the polymer and thereby reduce the film formation temperature of the latex. The solvents used to lower the glass transition temperature of the polymer are known in the industry as coalescing aids. The coalescing aids present in a typical thermoplastic paint composition increase the volatile organic content (VOC) of the paint.

An alternative way of producing a coating having hardness and toughness properties is to produce a latex with a Tg below room temperature which is capable of forming a film at room temperature, and then crosslinking the film to give film toughness and solvent resistance properties. In the published literature, there are many examples of curing chemistries that have been applied to solvent based systems. However, chemistries suitable for solvent based systems are not always applicable to waterborne systems.

The application of hydrosilation reactions in crosslinking silicon polymer systems is well known in the literature. An article published by Batch et al. in Rubber Chem. Technol., 64(2), 218–33 (1991) describes the hydrosilation reaction as applied to silicon systems. Also a review of this technology can be found in Silicone Rubber in Powder Form, Swanson, Leicht & Wegener, Amer. Chemical Society, Rubber Div., October 1974. Applications of this chemistry to non-silicon systems is limited.

EP Application 94109495.5 discloses a curable resin composition containing a homo- or copolymer of an organohydrogenpolysiloxane macromonomer, an allyl group containing polymer and a hydrosilation catalyst. The above patent, however, teaches melamine resin compositions which are not waterborne and does not refer to the use of hydrosilation chemistry in curing waterborne latex polymers.

U.S. Pat. No. 5,321,082 describes curable resin compositions comprising a polymer having a plurality of alkenyl groups, an organohydrogenpolysiloxane, a polymer having a plurality of alkenyl groups and a hydrosilation catalyst. This patent does not refer to compositions that cure waterborne latex polymers.

U.S. Pat. No. 4,962,165, refers to a process for making silicon-containing polymer particles by a suspension polymerization. The polymer particles of this patent are prepared by polymerization of functionalized silicon-containing material, containing at least one copolymerizable functional group per siloxane chain. The functionalized siloxane-containing material is then suspension polymerized to form crosslinked silicon rubber particles. The functionalized siloxane-containing material of this patent may alternatively be copolymerized with active surfactants by suspension polymerization or coated or encapsulated with other copolymerizable unsaturated monomers, as by an emulsion copolymerization, after the silicon-containing material has been crosslinked to modify the surface properties of the siloxane-containing material. The '165 patent however, does not use hydrosilation reactions as a method of controlling crosslinking reactions since the particles in the patent are pre-crosslinked.

EP 0 702 068 A1 Application refers to a method of forming multilayer coatings on a substrate such as automobile bodies. The method of EP 0 702 068 A1 Application comprises the steps of applying a pigmented basecoat composition onto the substrate, applying a clear topcoat composition onto the basecoat and curing both coats individually or simultaneously. The clear topcoat composition comprises a resin having pluralities of both hydrosilyl groups and alkenyl groups in the molecule, or a blend of resins having a plurality of hydrosilyl groups in the molecule with a resin having a plurality of alkenyl groups in the molecule. In addition the method of the EP 0 702 068 A1 Application requires a catalytically effective amount of a hydrosilylation catalyst. None of the compositions are waterborne latex polymers.

EP 0 602 933 A2 refers to a hydrosilylative composition comprising an acrylic polyester or epoxy resin having at least two alkenyl or alkynyl groups in a molecule, and an organic silicon compound having at least two hydrogen atoms each directly attached to a silicon atom in a molecule, a hydrosilylation catalyst, and at least one of an organic iron compound and an organic aluminum compound. None of the compositions are waterborne latex polymers.

EP 0 566 095 A1 and corresponding U.S. Pat. No. 5,321,082 refer to a curable resin composition containing a polymer having a plurality of alkenyl groups, and organohydrogenpolysiloxane having a plurality of hydrosilyl groups, a polymer having a plurality of alkynyl groups, and a hydrosilylation catalyst. The composition of the patents is stable at room temperature but is crosslinkable at an elevated temperature. None of the compositions are waterborne latex polymers.

EP 0 450 844 A2 refers to a curable resin composition which comprises an organic resin containing at least two alkenyl groups per molecule and having a specific molecular weight, and organohydrogen polysiloxane containing no less than two Si—H bonds per molecule and a platinum catalyst. The organic resin is preferably chosen from at least one of acrylic, polyester and epoxy resins. The compositions of this patent can be cured at low temperatures without shrinking to give a product having good water resistance, chemical resistance and recoatability. None of the compositions are waterborne latex polymers.

U.S. Pat. No. 5,539,073 describes the production of waterborne polymers that contain pendant allyl groups. The patent further describes the oxidative cure of such latexes with metal driers, but does not teach the use of hydrosilation reactions.

The prior art does not disclose any waterborne crosslinkable polymer compositions which may be cured using a hydrosilation reaction. Thus, there still exists a need for waterborne polymer compositions suitable for crosslinking by hydrosilation, without the use of coalescing agents or other compounds contributing to the volatile organic content (VOC).

SUMMARY OF THE INVENTION

The present invention relates to waterborne crosslinkable compositions encompassing (A) functional latex polymers containing at least one pendant ethylenically unsaturated functional group, (B) a silicon hydride compound which contains at least two reactive hydrogen atoms and (C) a catalyst suitable for reacting a silicon hydride compound with a functional latex polymer. Methods of making crosslinkable coating compositions are also disclosed. A film cast from the above waterborne composition provides enhanced solvent resistance and physical properties of the film.

BRIEF DESCRIPTION OF THE DRAWING

FIG. 1 shows the consumption of the SiH functionality in relation to temperature and time.

DETAILED DESCRIPTION OF THE INVENTION

This invention relates to waterborne crosslinkable coating compositions encompassing (A) functional latex polymers containing at least one ethylenically unsaturated functional group, (B) emulsions of a silicon hydride containing at least two reactive hydrogen groups, and (C) suitable hydrosilation catalysts.

Crosslinkable coating compositions of the present invention are preferably made by dissolving the catalyst in the functional latex polymer and then blending the latex polymer/catalyst mixture with a suitable emulsified silicon hydride compound. A film cast from the above waterborne composition can then be crosslinked to enhance solvent resistance and physical properties of the film.

(A) Functional Latex Polymers

Functional latex polymers containing pendant ethylenic unsaturation may be prepared by copolymerization of a bifunctional monomer, such as allyl methacrylate, with additional ethylenically unsaturated monomers. Such a process is described in U.S. Pat. No. 4,244,850 which is incorporated herein by reference. Alternatively, a synthesis providing a latex particle with acid, epoxy or carbodiimide functionality is followed by reaction with an epoxy or acid functional compound, respectively, which contains a double bond. Such processes are described in U.S. Pat. No. 4,244,850 and U.S. Pat. No. 4,033,920 which are incorporated herein by reference.

Any functional latex polymer that contains at least one pendant ethylenically unsaturated functional group may be employed as component (A), in accordance with the present invention. Ethylenically unsaturated groups are those groups where double covalent bonds exist between two carbon atoms. These unsaturated groups should be capable of reacting with silicon hydride in the presence of a catalyst. Suitable functional ethylenically unsaturated groups in accordance with the present invention include, but are not limited to, pendant allyl, (meth)acrylic, alkene or alkyne functionalities.

The term "polymer" is used throughout this application to denote a homopolymer or a copolymer; the term "(meth) acrylic" is used to denote a radical of formula:

$$CR_2^0=CR^0-C(=O)-O-;$$

the term "allyl" is used to denote a radical of formula $$CR_2^0=CR-R_2^0-;$$

the term "alkene" is used to denote a radical of formula:

$$CR_2^0=CR-R^0-;$$

and the term "alkyne" is used to denote a radical of formula:

$$CR^0\equiv C-;$$

where $R^0$ in all above formulas is a hydrogen or a $C_1-C_3$-alkyl group, preferably a hydrogen or a methyl group and more preferably a hydrogen.

Suitable copolymerizable monoethylenically unsaturated monomers for the preparation of the functional latex polymer in accordance with the present invention include, but are not limited to, a monoethylenically unsaturated monomer which may be represented by the general formula (I):

$$CH_2=C(R^1)COOR^2 \tag{I}$$

where $R^1$ is hydrogen or a $C_1-C_3$-alkyl group, and $R^2$ is a $C_1-C_{20}$-alkyl group, phenyl, benzyl, alkoxy-$(C_1-C_4)$-alkyl, cyclopentyl, cyclohexyl, furyl, $C_1-C_4$-akyl furyl, tetrahydrofuryl, $C_1-C_4$-alkyl tetrahydrofuryl and combinations of these monomers thereof. Combinations of monomers where $R^1$ is hydrogen and monomers where $R^1$ is an alkyl group are used to modify the glass transition temperature of the functional latex polymer. Preferred examples of comonomers represented by formula (I) are, but not limited to, (meth)acrylate, methyl (meth)acrylate, ethyl (meth) acrylate, propyl (meth)acrylate, isopropyl (meth)acrylate, butyl (meth)acrylate, isobutyl (meth)acrylate, hexyl (meth) acrylate, isooctyl (meth)acrylate, isodecyl (meth)acrylate, lauryl (meth)acrylate, stearyl (meth)acrylate, phenoxyethyl (meth)acrylate, methoxyethyl (meth)acrylate, benzyl (meth) acrylate, ethoxyethyl (meth)acrylate, 2-ethylhexyl (meth) acrylate, cyclopentyl (meth)acrylate and isobornyl (meth) acrylate, as well as combinations of those monomers thereof. The term "alkyl" is used to denote straight chain or branched alkyl groups. Further, the term "(meth)acrylate" is used to denote acrylate or methacrylate. A combination of these monomers may be used in order to achieve an appropriate Tg or other desired properties of the functional latex polymer.

Acrylic and methacrylic acid esters having a $C_1-C_{20}$ alcohol moiety are commercially available or can be prepared by known esterification processes.

Additional suitable monoethylenically unsaturated monomers include styrenic monomers. Styrenic monomer denotes styrene, or a substituted styrene such as $C_1-C_6$ alkyl ring-substituted styrene, $C_1-C_3$ alkyl α-substituted styrene or a combination of ring and α-alkyl substituted styrene. Preferred styrenic copolymerizable monomers include styrene, p-methyl styrene, o-methyl styrene, p-butyl styrene, α-methyl styrene and combinations thereof.

In addition, vinyl ester monomers may be used as copolymerizable monoethylenically unsaturated monomers. Vinyl ester monomers also include vinyl esters of vinyl alcohol such as the VEOVA® series available from Shell Chemical Company such as VEOVA® 5, VEOVA® 9, VEOVA® 10, and VEOVA® 11 products. See O. W. Smith, M. J. Collins, P. S. Martin, and D. R. Bassett, Prog. Org. Coatings, Vol 22, 19 (1993). The VEOVA® vinyl esters may be represented by general formula (II):

$$CH_2=CH-OC(O)-(C-(CH_3)_2)_n-H \tag{II}$$

where n is an integer corresponding to the number designation used in the trademark.

A preferred composition of the functional latex polymer of the present invention encompasses about 1 to about 15 weight percent of monomers containing the pendant functional group, with the remainder being an additional ethylenically unsaturated monomer, the total being a 100%. A more preferred composition encompasses about 2 to about 10 weight percent of monomers containing the pendant ethylenic unsaturated moiety.

In general, the monomers are polymerized by a conventional suspension or emulsion free-radical initiated polymerization technique. The polymerization can be initiated by a water-soluble or water-dispersible free-radical initiator, optionally in combination with a reducing agent, at an appropriate temperature, usually between about 35° C. and about 90° C. The polymerization of the monomers may be conducted batch wise, semi-batch or in a continuous mode.

A preferred particle size for the functional latex polymer in accordance with the present invention is from about 0.01 to about 5.0 $\mu$. A more preferred particle size is from about 0.05 to about 2.5 $\mu$.

The glass transition temperature (Tg) of the functional latex polymer, in accordance with the present invention, may be up to about 100° C. In a preferred embodiment of the present invention, where film forming at ambient temperatures of the particles is desirable, the glass transition temperature may preferably be under about 60° C.

A preferred molecular weight of the functional latex polymer in accordance with the present invention, is a weight average molecular weight (Mw) of from about 1,000 to about 10,000,000, as determined by gel permeation chromatography (GPC). A preferred range for the weight average molecular weight is from about 1,000 to about 1,000,000, more preferably from about 5,000 to about 250,000.

Suitable latexes for use in accordance with the present invention are, but are not limited to, allyl functional latexes described in U.S. Pat. No. 5,539,073 or acrylate functional latexes described in U.S. Pat. No. 4,244,850, both of which are incorporated herein by reference.

(B) Silicon Hydride Component

Silicon hydride compounds suitable for crosslinking in accordance with the present invention may be represented by the general Formula (III) below:

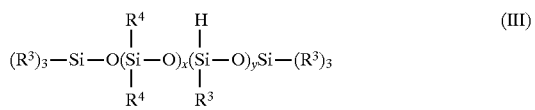

wherein $R^3$ are the same or different $C_1$–$C_3$ alkyl groups, $R^4$ are the same or different group selected from $C_1$–$C_3$ alkyl group, aryl group, aralkyl, cycloalkyl group, halide substituted $C_1$–$C_3$ alkyl group or an ester group. Further, x is an integer of from 0 to 200, preferably of 0 to 100 and more preferably from 0 to 50; and y is an integer of at least 2, preferably of from 10 to 50. In the present context, the molecular structure represented by Formula (III) may comprise blocks of (IIIa) or (IIIb) groups:

or the above groups may be randomly distributed throughout the polymer backbone. In this context, the term "block" is defined as a portion of a polymer molecule in which the monomeric units have at least one constitutional or configurational feature absent from the adjacent portions. Further, the hydrogen atoms of group (IIIb), which is directly connected to a silicon atom, is referred to as reactive hydrogen throughout this application. In addition, in the present application, "aryl" refers to phenyl, naphthyl or anthracenyl, in which each hydrogen atom may be replaced with a $C_1$–$C_2$ alkyl group. Thus, phenyl may be substituted from 1 to 4 times and naphthyl may be substituted from 1 to 6 times. Further, "alkyl" in this context refers to a straight chain or a branch alkyl group. Further, a "cycloalkyl" group may have additional $C_1$–$C_2$ alkyl substituents.

Preferable silicon hydrides are those that have increased solubility in the functional latex polymer. Preferably, at least one of $R^4$ groups is represented by formula

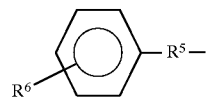

where $R^5$ is a $C_1$–$C_3$-alkyl group and $R^6$ is hydrogen or a $C_1$–$C_3$-alkyl group in the ortho, meta or para position of the phenyl ring. Examples of suitable silicon hydrides are, but not limited to, poly(dimethyl-co-methylhydrogen) siloxane, poly(phenylmethyl-co-methylhydrogen) siloxane, and the like. The silicon hydride material is preferably made into an aqueous emulsion.

The aqueous emulsion of the silicon hydride material is typically made by mechanical means and includes water and surfactants known in the art for making emulsions. A list of surfactants is available in the treatise: "McCutcheon's Emulsifiers Detergents", North American Edition and International Edition, MC Publishing Co., Glenn Rock, N.J., 1993. Suitable surfactants include, but are not limited to, surfactants that are compatible with the functional latex polymer such as anionic or nonionic surfactants.

(C) Catalysts

Suitable catalysts in accordance with the present invention are hydrosilation catalysts such as those, by way of example, described in the treatise: "Homogeneous Catalysis of Hydrosilylation by Transition Metals", J. Speier, Advances in Organometallic Chemistry, Vol. 17, Academic Press, 1979, 407–447. The catalysts may be chosen such that the reactivity can be controlled. Examples of suitable catalysts for use in the present invention include, but are not limited to, complexes of elements selected from platinum (Pt), palladium (Pd), rhodium (Rh) and ruthenium (Ru); more preferably, $PtCl_4$ or $H_2PtCl_6.6H_2O$. Other preferred catalysts are platinum olefin complexes such as complexes of platinum with vinyl siloxanes or maleates of maleic anhydride, $PdCl_2(PPh_3)_2$, $RhCl_2(PPh_3)_3$ and the like, where Ph denotes a phenyl group.

In a preferred embodiment, the catalyst is dissolved in an inert solvent, such as xylene, to form a catalyst solution which may then be added to the functional latex polymer. The polymer particles are allowed to swell with the inert solvent containing the catalyst thus forming an aqueous dispersion. Alternately, the catalyst may be emulsified with a portion of the functional latex polymer or a compatible latex polymer prior to addition to the functional latex polymer. A preformed aqueous emulsion of silicon hydride material and surfactant is then added to the aqueous dispersion to form the waterborne crosslinkable latex composition. A film cast from the above waterborne composition crosslinks to enhance solvent resistance and physical properties of the film.

The waterborne crosslinkable latex compositions of the present invention are useful in a variety of coating formulations such as architectural coatings, metal coatings, wood coatings, plastic coatings, textile coatings, cementitious coatings, paper coatings, inks, and adhesive. Examples of such coating formulations adapted for particular uses include, but are not limited to, corrosion inhibitors, concrete coatings, maintenance coatings, latex paints, industrial coatings, automotive coatings, textile backcoatings, surface printing inks and laminating inks. The compositions of the present invention may be incorporated in those coating formulations in the same manner as known polymer latexes and used with the conventional components and or additives of such compositions. The coating formulations may be clear or pigmented.

Upon formulation, a coating formulation containing the crosslinkable waterborne polymer compositions of the invention may then be applied to a variety of surfaces, substrates, or articles, e.g., paper, plastic, steel, aluminum, wood, gypsum board, concrete, brick, masonry, or galvanized sheeting (either primed or unprimed). The type of surface, substrate, or article to be coated generally determines the type of coating formulation used. The coating formulation may be applied using means known in the art. For example, a coating formulation may be applied by spraying or by coating a substrate. In general, the coatings may be dried by heating or allowed to air dry, depending on the type of catalyst used, as is known in the art. As a further aspect, the present invention relates to a shaped or formed article which has been coated with a coating formulation using the compositions of the present invention.

The crosslinkable waterborne polymer compositions of the present invention can be utilized alone or in conjunction with other conventional waterborne polymers. Such polymers include, but are not limited to, water dispersible polymers such as consisting of polyesters, polyester-amides, cellulose esters, alkyds, polyurethanes, epoxy resins, polyamides, acrylics, vinyl polymers, polymers having pendant allyl groups such as described in U.S. Pat. No. 5,539,073, styrene-butadiene polymers, vinylacetate-ethylene copolymers, and the like.

Having generally described this invention, a further understanding can be obtained by reference to certain specific examples which are provided herein for purpose of illustration only and are not intended to be limiting unless otherwise specified.

EXAMPLES

Example 1

Preparation Of Catalyst Emulsion 5.67 g of platinum(II) divinyltetramethyldisiloxane complex (2.2 wt. % Pt in xylene) was mixed into 25.0 g of XI-100 polyallylglycidylether, available from Monsanto. This mixture was then emulsified by adding 1.25 g of TERGITOL® NP40 surfactant (the reaction product of a nonylphenol and about 40 moles of ethylene oxide, available from Union Carbide, as a 70 wt. % solution in water), to 25.0 grams of the Pt/XI-100 mixture. To this mixture, 35 g of demineralized water was added slowly with mixing. This mixture was then emulsified using an ultrasonic emulsifier for 2 minutes, to produce a catalyst emulsion containing 41% solids by weight.

Example 2

Preparation Of Allyl Functional Latex

To a 1 L resin kettle equipped with a condenser, a stirring shaft with motor, a nitrogen purge and a subsurface feed tube were added 221 g of demineralized water, 2.80 g of sodium carbonate, 6.40 g of, HITENOL® HS-20 surfactant (a polyoxyethylenealkylphenyl ether ammonium sulfate, available from DKS International, Inc., Japan) as a 9.7% solution in $H_2O$, 0.74 g of TERGITOL® 15-S-40 surfactant (available from Union Carbide), 2.40 g of methyl methacrylate (MMA), 3.97 g of styrene (STY), 4.63 g of 2-ethylhexyl acrylate (2-EHA) and 0.02 g of trimethylolpropane triacrylate (TMPTA). The contents of the reactor were heated to 80° C. and then a solution of 2.95 g of sodium persulfate in 16 ml of demineralized water, was added to the reactor. After a 30 minute hold period, a monomer emulsion feed consisting of 133 g of demineralized water, 1.32 g of AEROSOL® OT-75 surfactant (a sodium dioctyl sulfosuccinate, available from Cytec Industries, Inc.), 3.92 g of TERGITOL® 15-S-40 surfactant, 45.64 g of MMA, 75.4 STY, 87.9 g of 2-EHA and 0.42 g of TMPTA was fed into the reactor over 140 minutes. At the same time, 1.67 g of sodium persulfate in 43.04 g of demineralized water was fed into the reactor over a 300 minute period. After the first monomer feed was finished, a second monomer feed consisting of 75 g of demineralized water, 1.95 g of TERGITOL® 15-S-40 surfactant, 4.19 g of AEROSOL® 18 surfactant (a N-octadecyl sulfosuccinate surfactant, available from Cytec Industries, Inc.), 113 g of STY, 78.9 g of 2-EHA, 19.0 g of allyl methacrylate, and 1.92 g of 2-ethylhexyl mercaptopropionate was fed into the reactor over the next 140 minutes. The reaction was then allowed to cool and the latex filtered through a 100 mesh screen.

Example 3

Preparation of Poly(methylphenyl-co-methylhydrogen)siloxane Emulsion 0.50 g of sodium lauryl sulfate were dissolved in 30 g of demineralized $H_2O$. To this solution was added with stirring, 20 g of HPM-502 poly(methylphenyl-co-methylhydrogen) siloxane (available from Gelest). The solution was then emulsified using an ultrasonic emulsifier. The resulting emulsion had a particle size of 420 nm as measured by dynamic light scattering.

Example 4

Preparation of Crosslinkable Latex Composition

To 50 g of allyl functional latex in Example 2 was added 1.22 g of the XI-100/Pt catalyst emulsion of Example 1. The latex was allowed to stir for 24 hours. To this latex was added 2 g of poly(phenylmethyl-co-methyl hydrogen) siloxane of Example 3 and the latex was gently shaken. A film of the waterborne crosslinkable latex composition was cast onto a zinc selinide crystal. The spectra was obtained and the ratio of the allyl absorbance at 1649 $cm^{-1}$ to styrene absorbance at 1601 $cm^{-1}$ was obtained. The film was then heated to 60° C. for ½ hour and the spectra recorded again. The absorbance ratio for the allyl to styrene is shown in Table 1. The allyl functionality decreased by 56%.

Example 5

Comparative Example

Preparation of a Non-Crosslinkable Latex Composition

To 50 g of allyl functional latex in Example 2 was added 1.22 g of the XI-100/Pt emulsion of Example 1. The latex was allowed to stir for 24 hours. A film of the latex was cast onto a zinc selinide crystal. The FT-IR spectrum was obtained and the ratio of the allyl absorbance at 1649 cm$^{-1}$ to styrene absorbance at 1601 cm$^{-1}$ was obtained. The film was then heated to 60° C. for ½ hour and the FT-IR spectrum recorded again. The absorbance ratio for the allyl to styrene is shown in Table 1. The allyl functionality decreased by 2%.

TABLE 1

Comparative Example Showing Change In Allyl/Styrene Ratio

| | | | Allyl to Styrene | |
|---|---|---|---|---|
| Example # | Functionality | Pt (II) Conc. | Before Heating | After Heating |
| 4 | Allyl/SiH | 100 ppm | 0.084 | 0.047 |
| 5 | Allyl | 100 ppm | 0.086 | 0.083 |

Example 6

Reaction Rate with Temperature

A waterborne crosslinkable latex composition was made in a manner similar to Example 4. Several films of the waterborne crosslinkable latex were cast over zinc selinide crystals. The spectra were obtained and the ratio of the allyl absorbance at 1649 cm$^{-1}$ to styrene absorbance at 1601 cm$^{-1}$ was recorded. The films were then heated at 75°, 90°, 105° and 120° C. The relative absorbance of SiH (2150 cm$^{-1}$) was recorded and the absorbance ratio to the room temperature absorbance were plotted with time. The results in FIG. 1 show a clear consumption of the SiH functionality with time.

Obviously, numerous modifications and variations of the present invention are possible in light of the above teachings. It is therefore to be understood that within the scope of the appended claims, the invention may be practiced otherwise than as specifically described herein.

What is claimed is:

1. A waterborne crosslinkable composition comprising:
   (A) a functional latex polymer, said polymer containing at least one pendant ethylenically unsaturated functional group;
   (B) a silicon hydride compound containing at least two reactive hydrogen atoms; and
   (C) a catalyst.

2. The waterborne crosslinkable composition of claim 1 wherein said pendant ethylenically unsaturated functional group of said functional latex polymer is selected from the group consisting of allyl, (meth)acrylic, alkene and alkyne.

3. The waterborne crosslinkable composition of claim 1, wherein said functional latex polymer has a Tg of up to 100° C.

4. The waterborne crosslinkable composition of claim 1, wherein said functional latex polymer has a weight average molecular weight of from 1,000 to 10,000,000.

5. The waterborne crosslinkable composition of claim 1, wherein said silicon hydride compound is represented by Formula (III):

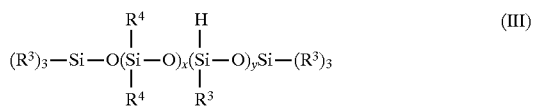

wherein R$^3$ are the same or different C$_1$–C$_3$ alkyl groups, R$^4$ are the same or different groups selected from C$_1$–C$_3$ alkyl, aryl, aralkyl, cycloalkyl, halide substituted C$_1$–C$_3$ alkyl and ester and wherein x is an integer of from 0 to 200 and y is an integer of at least 2.

6. The waterborne crosslinkable composition of claim 1 wherein said silicon hydride material is selected from the group consisting of poly(dimethyl-co-methyl-hydrogen)siloxane and poly(phenylmethyl-co-ethylhydrogen) siloxane.

7. The waterborne crosslinkable composition of claim 1 wherein said catalyst is a hydrosilation catalyst.

8. The waterborne crosslinkable composition of claim 1 wherein said catalyst is a complex of elements selected from the group consisting of platinum (Pt), palladium (Pd), rhodium (Rh) and ruthenium (Ru).

9. The waterborne crosslinkable composition of claim 1 wherein said catalyst is selected from the group consisting of PtCl$_4$ and H$_2$PtCl$_6$.6H$_2$O.

10. A method of making a waterborne crosslinkable latex composition, comprising the steps of
   dissolving a catalyst in an inert solvent and forming a catalyst emulsion;
   adding said catalyst emulsion to a functional latex polymer, said polymer containing at least one pendant ethylenically unsaturated functional moiety, to form an aqueous polymer dispersion;
   forming an aqueous emulsion of a silicon hydride material containing at least two reactive hydrogen atoms; and
   adding said silicon hydride aqueous emulsion to said aqueous polymer dispersion, thus forming a waterborne crosslinkable latex composition.

11. The method of claim 10 wherein said catalyst is a hydrosilation catalyst.

12. The method of claim 10 wherein said pendant ethylenically unsaturated functional moiety of said functional latex polymer is selected from the group consisting of allyl, (meth)acrylic, alkene and alkyne.

13. The method of claim 10 wherein said silicon hydride compound is selected from the group consisting of poly(dimethyl-co-methylhydrogen)siloxane and poly(phenylmethyl-co-methylhydrogen)siloxane.

14. A method for the formation of a crosslinked film, comprising the steps of
   dissolving a catalyst in an inert solvent and forming a catalyst emulsion;
   adding said catalyst emulsion to a functional latex polymer, said polymer containing at least one pendant ethylenically unsaturated functional moiety, to form an aqueous polymer dispersion;
   forming an aqueous emulsion of a silicon hydride material containing at least two reactive hydrogen atoms; and
   adding said silicon hydride aqueous emulsion to said aqueous polymer dispersion, thus forming a waterborne crosslinkable composition;
   applying said waterborne crosslinkable composition to a substrate to form a crosslinked film.

15. The method of claim 14 wherein said catalyst is a hydrosilation catalyst.

16. The method of claim 14 wherein said pendant ethylenically unsaturated functional moiety of said functional latex polymer is selected from the group consisting of allyl, (meth)acrylic, alkene and alkyne.

17. The method of claim 14 wherein said silicon hydride compound is selected from the group consisting of poly(dimethyl-co-methylhydrogen)siloxane and poly(phenylmethyl-co-methylhydrogen)siloxane.

* * * * *

UNITED STATES PATENT AND TRADEMARK OFFICE
CERTIFICATE OF CORRECTION

PATENT NO. : 5,891,966
DATED : April 6, 1999
INVENTOR(S) : David Logan Murray, Martha Jean Collins, James Wayne Taylor It is certified that error appears in the above-identified patent and that said Letters Patent is hereby corrected as shown below:

Column 10, Line 6: poly(phenylmethyl-co-methylhydrogen)

Signed and Sealed this

Eleventh Day of January, 2000

Attest:

Q. TODD DICKINSON

*Attesting Officer*  *Acting Commissioner of Patents and Trademarks*